Patented Feb. 18, 1936

2,030,958

UNITED STATES PATENT OFFICE 2,030,958

PROCESS FOR PREPARING CALCIUM SALTS OF SUBSTITUTED QUINOLINE CARBOXYLIC ACIDS

Philip J. Breivogel, Glen Ridge, N. J.

No Drawing. Application May 17, 1932,
Serial No. 611,937

12 Claims. (Cl. 260—39)

One object of this invention is the preparation of the calcium salts of an aryl quinoline carboxylic acid and especially the calcium salts of 2-phenyl quinoline 4-carboxylic acid.

A further object is the preparation of the calcium salts of alkyl aryl quinoline carboxylic acids.

It is a still further object of this invention to prepare the calcium salt of 6-methyl 2-phenyl quinoline 4-carboxylic acid.

These and other objects which will be apparent from the sequent description of the invention, are all contemplated by this invention which is to be limited only by the prior art and the scope of the appended claims.

Derivatives of the cinchona alkaloids such as cinchoninic acid or quinoline 4-carboxylic acid have been recognized as therapeutic agents beneficial in the treatment of various rheumatic disorders, but the unsubstituted compounds have decidedly unpleasant tastes and also have very undesirable toxic effects. To remedy this it has been proposed to substitute a phenyl group in the 2 position of the quinoline nucleus whereby the bitter taste is somewhat reduced. Compounds of this nature, 2-phenyl quinoline 4-carboxylic acid or 2-phenyl 4-cinchoninic acid having the structural formula

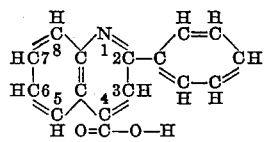

are commonly referred to by the name of "Cincophen" and have been used with some measure of success as therapeutic agents but they have bitter tastes and detrimental toxicity. As a further development, the methyl group was added to this compound at the 6 position to form 6-methyl 2-phenyl quinoline 4-carboxylic acid or 6-methyl 2-phenyl 4-cinchoninic acid which, while not being as unpleasant to the taste as the phenyl derivative, still possessed some undesirable toxic properties. This compound, the structural formula of which is

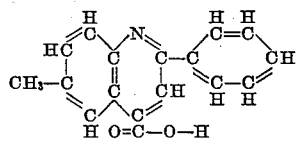

is known as "Paratophan". It was recognized that even this derivative left much to be desired with respect to taste, toxic effect and general effectiveness for the use to which these compounds are considered adapted and various proposals have been submitted for overcoming the detrimental properties and at the same time enhancing the therapeutic properties of these compounds.

Among these proposals to improve the therapeutic properties of the cinchoninic acid derivatives is the suggestion of forming esters and adding to the groups in the quinoline nucleus whereby an improved therapeutic agent resulted.

Another method of overcoming the therapeutic imperfections of the cinchoninic acid derivatives is that suggested by Crossley in U. S. Patent No. 1,618,172, February 22, 1927, namely, by the preparation of a magnesium salt of the phenyl derivative by reacting a suspension of the derivative with an insoluble magnesium compound to form a product which it is stated has desirable therapeutic properties. In contradistinction to the above described efforts, the present invention comprises a process wherein calcium salts which have more desirable properties with respect to taste and reduced toxicity than do the corresponding magnesium salts are prepared by a reaction which is carried out in solution.

By means of the present invention novel compounds have been prepared which are practically tasteless and in which the toxic effects have been very materially reduced, in fact, the therapeutic effectiveness of the organic acid is increased in many ways, as for example, the desired effect is secured in a shorter period of time than is the case with known related agents.

These results are obtained by incorporating a calcium compound with the cinchoninic acid or quinoline 4-carboxylic acid and particularly by forming the calcium salts of cinchoninic acid, quinoline 4-carboxylic acid, or their derivatives.

The new product is obtained by preparing solutions of sodium, potassium, ammonium or other soluble salts of substituted quinoline 4-carboxylic acid or its derivatives, referred to in the claims as soluble compounds of the acid or its derivatives, and treating the solution with a soluble calcium salt to form a calcium salt of a substituted quinoline 4-carboxylic acid or its derivative. More specifically, these salts are obtained by dissolving a suitable quantity of the substituted quinoline 4-carboxylic acid or its derivatives in an alkaline solution which may contain alcohol, neutralizing the excess alkali and adding a solution of a soluble calcium salt whereby a precipitate of the calcium salt of substituted quinoline 4-carboxylic acid or its derivatives is obtained. The product on washing and drying occurs as a white or nearly white powder, slightly soluble in water and alcohol and practically odorless. It decomposes upon melting and when ignited leaves a residue of calcium oxide.

The following specific examples illustrate preferred embodiments of the invention, but they are not to be construed as limiting but merely as showing suitable specific ways in which this invention may be carried out.

*Example I*

500 grams of 2-phenyl quinoline 4-carboxylic acid are well mixed with 400 c. c. of alcohol Sp. Den. #1, to which is then added a solution of 88 grams of caustic soda in 2000 c. c. of distilled water at a temperature of 60° C. When the solution is complete it is carefully neutralized to phenolphthalein by adding hot dilute hydrochloric acid while stirring vigorously. If, during the addition a precipitate occurs the acid supply is stopped until the precipitate has redissolved. When the solution is neutral to the phenolphthalein 20 grams of "Darco", a decolorizing carbon, is added, following which the solution is stirred for one half hour while maintained at a temperature of approximately 60° C. The solution is then filtered and enough water added through the filter to make the total volume of the filtrate 5000 c. c. The solution should then be heated to about 70° C. and while stirring vigorously a solution of 110 grams of anhydrous calcium chloride dissolved in 2000 c. c. of distilled water at a temperature of about 70° C. is added. The stirring is continued until the solution has cooled to about 30° C. when the precipitate which has been formed by the addition of the calcium chloride solution is filtered off and washed until it is free from chlorides. If the filter cake is dried at a temperature of about 60° C. for 48 hours, it falls to a powder and no grinding is necessary. By using the above amounts of reagents a yield of approximately 498 grams of the calcium salt of 2-phenyl quinoline 4-carboxylic acid will be obtained. The product which has the structural formula

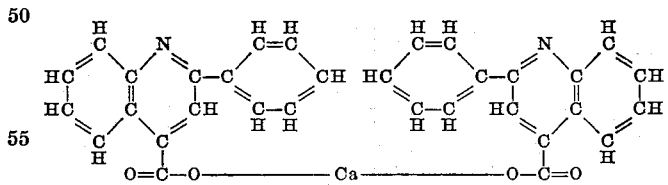

is a fine, white or nearly white, light fluffy powder which is slightly bitter in taste and practically odorless. It is only slightly soluble in water and alcohol.

This product can be identified by the following properties.

Upon ignition a residue of calcium oxide is obtained.

Mix 10 grams of the product, the calcium salt of 2-phenyl quinoline 4-carboxylic acid, with 100 c. c. of water and add 25 c. c. of a 10% sodium carbonate solution. Boil the resulting solution for 5 minutes and then filter hot. Carefully add dilute hydrochloric acid to the filtrate until precipitation is complete, cool and filter. Wash the residue well until the washings are free from chloride, then dry at 60° C. The free acid isolated according to the above method gives the following tests:

1. It melts at about 210° C. with partial decomposition.
2. When pure, each gram will neutralize 4.015 c.c. of normal sodium hydroxide.
3. A saturated solution in hot dilute hydrochloric acid yields with platinic chloride test solution a precipitate of yellowish-brown crystals.
4. Dissolve one gram of the free acid in an excess of ammonia test solution, evaporate to dryness on a water bath and then dissolve in 20 c. c. of water. Portions of the solution yield a white flocculent precipitate with silver nitrate test solution, a yellowish flocculent precipitate with lead acetate test solution and a green flocculent precipitate with copper sulphate test solution.

*Example II*

Another example as applied to a methyl derivative, i. e. 6-methyl 2-phenyl quinoline 4-carboxylic acid is: 500 grams of the 6-methyl 2-phenyl quinoline 4-carboxylic acid either in a solid state or mixed with alcohol as described in the foregoing example, is added to a solution of 88 grams of sodium hydroxide in 2000 c. c. of distilled water at 70° C. The resulting solution when complete is carefully neutralized to phenolphalein by adding hot dilute hydrochloric acid while stirring vigorously. Should any precipitate occur, the addition of the acid is stopped until the precipitate has redissolved. When the solution has been neutralized 20 grams of "Darco" is added and the solution stirred for about one half hour while the temperature is maintained at 60° C. The solution is then filtered and enough water added through the filter to make the total volume of the filtrate 5000 c. c. The resulting solution is heated to 70° C. and to it is added 110 grams of anhydrous calcium chloride dissolved in 2000 c. c. of distilled water at 70° C. This mixture is stirred until it has cooled to about 30° C. when it may be filtered and the precipitate washed until it is free from chloride and the cake dried at 60° C. for about 48 hours. The product, the calcium salt of 6-methyl 2-phenyl quinoline 4-carboxylic acid, which has the structural formula

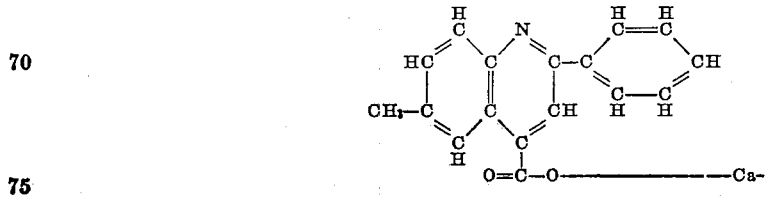 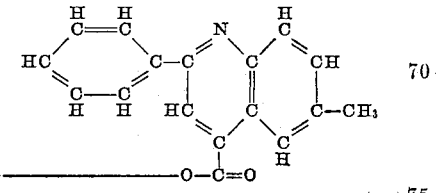

is a fine white or nearly white, light fluffy powder, practically odorless and tasteless, only slightly soluble in water and alcohol.

This product can be identified by the following properties:

Upon ignition a residue of calcium oxide is obtained.

Mix 10 grams of the product, the calcium salt of 2-phenyl quinoline 4-carboxylic acid with 100 c. c. of water and add 25 c. c. of a 10% sodium carbonate solution, boil the resulting solution for 5 minutes and then filter hot. Carefully add dilute hydrochloric acid to the filtrate until precipitation is complete, cool and filter. Wash the residue well until the washings are free from chloride, then dry at 60° C. The free acid isolated according to the above method gives the following tests:

1. It melts at 228° C.
2. When pure each gram will neutralize 3.8006 c. c. of normal sodium hydroxide.
3. A saturated solution in hot dilute hydrochloric acid yields with platinic chloride test solution a precipitate of yellowish-brown crystals.
4. Dissolve one gram of the free acid in an excess of ammonia test solution, evaporate to dryness on a water bath and then dissolve in 20 c. c. of water. Portions of the solution yield a white flocculent precipitate with silver nitrate test solution, a yellow flocculent precipitate with lead acetate test solution and a green flocculent precipitate with copper sulphate test solution.

The two specific examples given above show an application of the invention to 2-phenyl quinoline 4-carboxylic acid and 6-methyl 2-phenyl quinoline 4-carboxylic acid respectively, but it is not intended that the invention be limited thereto since other alkyl or alkoxy groups such as ethyl, propyl and the like or other aryl groups such as alkyl substituted phenyl groups, naphthyl and the like may be substituted for the methyl or phenyl derivatives to which the examples are particularly directed.

It is also contemplated that the number and respective positions of the substituted groups on the quinoline nucleus may be varied. Obviously these variations in the acid radical will have a more or less marked influence on the therapeutic properties of the resulting calcium salt but it will be found to be the rule that the combination of the substituted quinoline 4-carboxylic acid with calcium will result in a decrease in the toxic effect of the material. Instead of calcium chloride other soluble calcium salts such as the acetate, bromide, etc., may be used to effect precipitation of the calcium salts.

Since the quinoline carboxylic acid nucleus is monovalent while calcium is divalent the resulting product is a compound comprising two quinoline carboxylic acid groups in combination with one calcium molecule. Both quinoline carboxylic acid groups have the same substitutions on each.

The 2-phenyl or 6-methyl 2-phenyl derivatives of quinoline 4-carboxylic acid when in combination with calcium are suitable for internal administration and possess pronounced analgesic, antipyretic and uric acid eliminant properties. They are less disturbing to the digestive system and physiologically less toxis to the human organism than the corresponding derivatives not combined with calcium.

It will be appreciated that various changes may be made by those skilled in the art in the details of the process and particularly in the selection and proportions of the ingredients, the order of the steps and the temperatures used without departing from the invention or sacrificing the advantages thereof and, while the invention has been described above in detail, it is to be understood that many changes may be made therein without departing from the spirit of the same and no limitations are to be imposed except those of the prior art and the appended claims.

What I claim is:

1. The process for preparing the calcium salt of a 2-phenyl quinoline 4-carboxylic acid which comprises dissolving a 2-phenyl quinoline 4-carboxylic acid in an aqueous alkaline solution containing an excess of alkali, neutralizing the excess alkali, and adding a soluble calcium salt.

2. The process for preparing the calcium salt of 6-methyl 2-phenyl quinoline 4-carboxylic acid which comprises dissolving a 6-methyl 2-phenyl quinoline 4-carboxylic acid in an aqueous alkaline solution containing an excess of alkali, neutralizing the excess alkali, and adding a soluble calcium salt.

3. The process for preparing the calcium salt of 2-phenyl quinoline 4-carboxylic acid which comprises dissolving 2-phenyl quinoline 4-carboxylic acid in an alkaline aqueous solution containing an excess of alkali, neutralizing with dilute hydrochloric acid until the solution is just neutral to phenolphthalein, adding a solution of a soluble calcium salt and recovering the precipitated calcium salt of 2-phenyl quinoline 4-carboxylic acid.

4. The process for preparing the calcium salt of 2-phenyl quinoline 4-carboxylic acid which comprises dissolving 2-phenyl quinoline 4-carboxylic acid in an alkaline aqueous solution containing an excess of alkali, neutralizing with dilute hydrochloric acid until the solution is just neutral to phenolphthalein, adding a solution of a soluble calcium salt while maintaining the reaction mixture at a temperature of about 70° C. and recovering the precipitated calcium salt of 2-phenyl quinoline 4-carboxylic acid.

5. The process for preparing the calcium salt of 6-methyl 2-phenyl quinoline 4-carboxylic acid which comprises dissolving 6-methyl 2-phenyl quinoline 4-carboxylic acid in an alkaline aqueous solution containing an excess of alkali, neutralizing with dilute hydrochloric acid until the solution is just neutral to phenolphthalein, adding a solution of a soluble calcium salt and recovering the precipitated calcium salt of 6-methyl 2-phenyl quinoline 4-carboxylic acid.

6. The process for preparing the calcium salt of 6-methyl 2-phenyl quinoline 4-carboxylic acid which comprises dissolving 6-methyl 2-phenyl quinoline 4-carboxylic acid in an alkaline aqueous solution containing an excess of alkali, neutralizing with dilute hydrochloric acid until the solution is just neutral to phenolphthalein, adding a solution of a soluble calcium salt while maintaining the reaction mixture at a temperature of about 70° C. and recovering the precipitated calcium salt of 6-methyl 2-phenyl quinoline 4-carboxylic acid.

7. The process for preparing the calcium salt of a 2-phenyl quinoline 4-carboxylic acid which comprises dissolving a 2-phenyl quinoline 4-carboxylic acid in an alkaline aqueous solution containing an excess of alkali, and alcohol, neutralizing with dilute hydrochloric acid until the solution is just neutral to phenolphthalein, adding a solution of a soluble calcium salt and recovering the precipitated calcium salt of a 2-phenyl quinoline 4-carboxylic acid.

8. The process for preparing the calcium salt of 2-phenyl quinoline 4-carboxylic acid which comprises dissolving 2-phenyl quinoline 4-carboxylic acid in an alkaline aqueous solution containing an excess of alkali, and alcohol, neutralizing with dilute hydrochloric acid until the solution is just neutral to phenolphthalein, adding a solution of a soluble calcium salt and recovering the precipitated calcium salt of 2-phenyl quinoline 4-carboxylic acid.

9. The process for preparing the calcium salt of 6-methyl 2-phenyl quinoline 4-carboxylic acid which comprises dissolving 6-methyl 2-phenyl quinoline 4-carboxylic acid in an alkaline aqueous solution containing an excess of alkali, and alcohol, neutralizing with dilute hydrochloric acid until the solution is just neutral to phenolphthalein, adding a solution of a soluble calcium salt and recovering the precipitated calcium salt of 6-methyl 2-phenyl quinoline 4-carboxylic acid.

10. The process for preparing the calcium salt of a 6-alkyl 2-phenyl quinoline 4-carboxylic acid which comprises dissolving said 6-alkyl 2-phenyl quinoline 4-carboxylic acid in an alkaline solution containing an excess of alkali, neutralizing the excess alkali and reacting therewith a calcium salt in solution.

11. The process for preparing the calcium salt of a 6-alkyl 2-phenyl quinoline 4-carboxylic acid which comprises dissolving such 6-alkyl 2-phenyl quinoline 4-carboxylic acid in an alkaline aqueous solution containing an excess of alkali, neutralizing with dilute hydrochloric acid until the solution is just neutral to phenolphthalein, adding a solution of a soluble calcium salt and recovering the precipitated calcium salt of the alkyl derivative of 2-phenyl quinoline 4-carboxylic acid.

12. The process for preparing the calcium salt of a 6-alkyl 2-phenyl quinoline 4-carboxylic acid which comprises dissolving such 6-alkyl 2-phenyl quinoline 4-carboxylic acid derivative in an alkaline aqueous solution containing an excess of alkali, and alcohol, neutralizing with dilute hydrochloric acid until the solution is just neutral to phenolphthalein, adding a solution of a soluble calcium salt and recovering the precipitated calcium salt of the alkyl derivative of 2-phenyl quinoline 4-carboxylic acid.

PHILIP J. BREIVOGEL.